(12) United States Patent
Yamamoto

(10) Patent No.: US 11,383,443 B2
(45) Date of Patent: Jul. 12, 2022

(54) ADDITIVE MANUFACTURING DEVICE AND MANUFACTURING METHOD FOR ADDITIVE-MANUFACTURED OBJECT

(71) Applicant: IHI CORPORATION, Tokyo (JP)

(72) Inventor: Naoya Yamamoto, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/759,516

(22) PCT Filed: Oct. 29, 2018

(86) PCT No.: PCT/JP2018/040173
§ 371 (c)(1),
(2) Date: Apr. 27, 2020

(87) PCT Pub. No.: WO2019/088043
PCT Pub. Date: May 9, 2019

(65) Prior Publication Data
US 2020/0276762 A1    Sep. 3, 2020

(30) Foreign Application Priority Data

Oct. 31, 2017   (JP) .............................. JP2017-211075

(51) Int. Cl.
*B29C 64/371* (2017.01)
*B29C 64/25* (2017.01)
(Continued)

(52) U.S. Cl.
CPC ............ *B29C 64/371* (2017.08); *B22F 3/105* (2013.01); *B29C 64/25* (2017.08); *B33Y 10/00* (2014.12); *B33Y 30/00* (2014.12)

(58) Field of Classification Search
CPC .......... B22F 10/20; B22F 12/00; B22F 12/38; B22F 12/70; B22F 2003/248; B22F 3/105;
(Continued)

(56) References Cited

U.S. PATENT DOCUMENTS

| 4,818,562 A | 4/1989 | Arcella et al. |
| 2005/0074550 A1 | 4/2005 | Leuterer et al. |

(Continued)

FOREIGN PATENT DOCUMENTS

| CN | 1608832 A | 4/2005 |
| CN | 104493165 A | 4/2015 |

(Continued)

OTHER PUBLICATIONS

English Translation of International Preliminary Reporton Patentability Chapter I filed on May 5, 2020 in Application WO2018JP40173 (Published on May 9, 2019 as WO2019088043) (Year: 2020).*

(Continued)

*Primary Examiner* — Joseph S Del Sole
*Assistant Examiner* — Manley L Cummins, IV
(74) *Attorney, Agent, or Firm* — Volpe Koenig

(57) ABSTRACT

An additive manufacturing device includes a molding unit including a molding tank accommodating a manufactured object and forming the manufactured object in the molding tank, a pressure vessel accommodating the molding unit, and a gas supply unit connected to the pressure vessel, supplying a gas into the pressure vessel, and configured to pressurize an inner portion of the pressure vessel.

3 Claims, 3 Drawing Sheets

(51) Int. Cl.
  *B22F 3/105* (2006.01)
  *B33Y 10/00* (2015.01)
  *B33Y 30/00* (2015.01)

(58) Field of Classification Search
  CPC ..... B29C 64/25; B29C 64/268; B29C 64/364; B29C 64/371; B33Y 10/00; B33Y 20/00; B33Y 30/00; B33Y 40/20
  See application file for complete search history.

(56) References Cited

U.S. PATENT DOCUMENTS

| | | | |
|---|---|---|---|
| 2005/0116391 | A1 | 6/2005 | Lindemann et al. |
| 2006/0118532 | A1 | 6/2006 | Chung et al. |
| 2006/0204603 | A1 | 9/2006 | Leuterer et al. |
| 2007/0026099 | A1 | 2/2007 | Hagiwara |
| 2007/0026145 | A1 | 2/2007 | Lindemann et al. |
| 2009/0206522 | A1 | 8/2009 | Hein et al. |
| 2009/0255912 | A1* | 10/2009 | Dietrich ............... B29C 64/371 425/174 |
| 2010/0044547 | A1 | 2/2010 | Higashi et al. |
| 2010/0044922 | A1 | 2/2010 | Higashi et al. |
| 2010/0163405 | A1 | 7/2010 | Ackelid |
| 2012/0234671 | A1 | 9/2012 | Ackelid |
| 2013/0101803 | A1 | 4/2013 | Grebe et al. |
| 2015/0314389 | A1 | 11/2015 | Yamada |
| 2016/0101469 | A1* | 4/2016 | Kawada ............... B29C 64/153 425/78 |
| 2016/0332228 | A1* | 11/2016 | Mackie ............... B22F 12/38 |
| 2016/0339639 | A1* | 11/2016 | Chivel ............... B23K 15/002 |
| 2017/0136538 | A1 | 5/2017 | Yoshimura |
| 2017/0165911 | A1 | 6/2017 | Kiriyama et al. |
| 2018/0169938 | A1 | 6/2018 | Inenaga et al. |
| 2018/0243827 | A1 | 8/2018 | Nakano et al. |
| 2019/0160535 | A1 | 5/2019 | Yoshimura |

FOREIGN PATENT DOCUMENTS

| | | |
|---|---|---|
| DE | 102009038255 A1 | 3/2010 |
| JP | 63-230264 A | 9/1988 |
| JP | 2004-524995 A | 8/2004 |
| JP | 2006-183146 A | 7/2006 |
| JP | 2007-030303 A | 2/2007 |
| JP | 2010-047813 A | 3/2010 |
| JP | 2010-509092 A | 3/2010 |
| JP | 2010-526694 A | 8/2010 |
| JP | 2013-091316 A | 5/2013 |
| JP | 2015-193187 A | 11/2015 |
| JP | 2015-196856 A | 11/2015 |
| JP | 2016-074957 A | 5/2016 |
| JP | 2017-109355 A | 6/2017 |
| JP | 6154544 B1 | 6/2017 |
| JP | 2017-144594 A | 8/2017 |
| JP | 2017-144597 A | 8/2017 |
| WO | 92/08592 A1 | 5/1992 |
| WO | 2017/047139 A1 | 3/2017 |
| WO | 2017/081812 A1 | 5/2017 |

OTHER PUBLICATIONS

Notice of Reasons for Refusal (TRANSLATED) filed on Jan. 19, 2021 in Application JP 20190550381 (Published Jul. 27, 2020 as JPWO2019088043). (Year: 2021).*

European Search Opinion filed on Dec. 11, 2020 in Application EP20180874726 (Published Sep. 9, 2020 as EP 3705268). (Year: 2020).*

C.Korner, "Additive manufacturing of metallic components by selective electron beam melting—a review", International Matrials Reviews, vol. 61, No. 5, Jul. 3, 2016, p. 361-p. 377, XP055314940.

* cited by examiner

ADDITIVE MANUFACTURING DEVICE AND MANUFACTURING METHOD FOR ADDITIVE-MANUFACTURED OBJECT

TECHNICAL FIELD

The present disclosure relates to an additive manufacturing device and a manufacturing method for an additive-manufactured object.

BACKGROUND ART

Known are devices molding an additive-manufactured object by irradiating powder with an electron beam, laser light, or the like. In these devices, the temperature of the manufactured object becomes high, and thus the manufactured object needs to be cooled. For example, in a case where the device is not provided with special cooling means, the manufactured object is held in a vacuum or the atmosphere in a state where the manufactured object is buried in powder such as metal powder. Then, the state where the manufactured object is held is maintained until the manufactured object is cooled and reaches a predetermined temperature or a temperature lower than the predetermined temperature. In this case, the manufactured object is insulated by the powder and requires a very long cooling time. Meanwhile, methods for shortening the cooling time of a manufactured object have been studied. For example, in the device that is described in Patent Document 1, a flow path through which a refrigerant flows is provided in the wall of a molding box and the molding box is cooled by the refrigerant flowing through the flow path. In the device that is described in Patent Document 2, a small second molding region is used when a small object is molded. As a result, the powder material that remains around the manufactured object is reduced and the cooling time is shortened.

CITATION LIST

Patent Literature

Patent Document 1: International Publication No. 2017/081812
Patent Document 2: Japanese Unexamined Patent Publication No. 2007-30303

SUMMARY OF INVENTION

Technical Problem

In the devices described in Patent Documents 1 and 2, no sufficient effect can be anticipated from the viewpoint of promoting the cooling of a manufactured object. The present disclosure describes an additive manufacturing device and a manufacturing method for an additive-manufactured object allowing the cooling of a manufactured object to be effectively promoted.

Solution to Problem

An additive manufacturing device according to one aspect of the present disclosure includes a molding unit including a molding tank accommodating a manufactured object and forming the manufactured object in the molding tank, a pressure vessel accommodating the molding unit, and a gas supply unit connected to the pressure vessel, supplying a gas into the pressure vessel, and configured to pressurize an inner portion of the pressure vessel.

Effects of Invention

According to one aspect of the present disclosure, cooling of a manufactured object can be effectively promoted.

DESCRIPTION OF EMBODIMENTS

Figure 1:
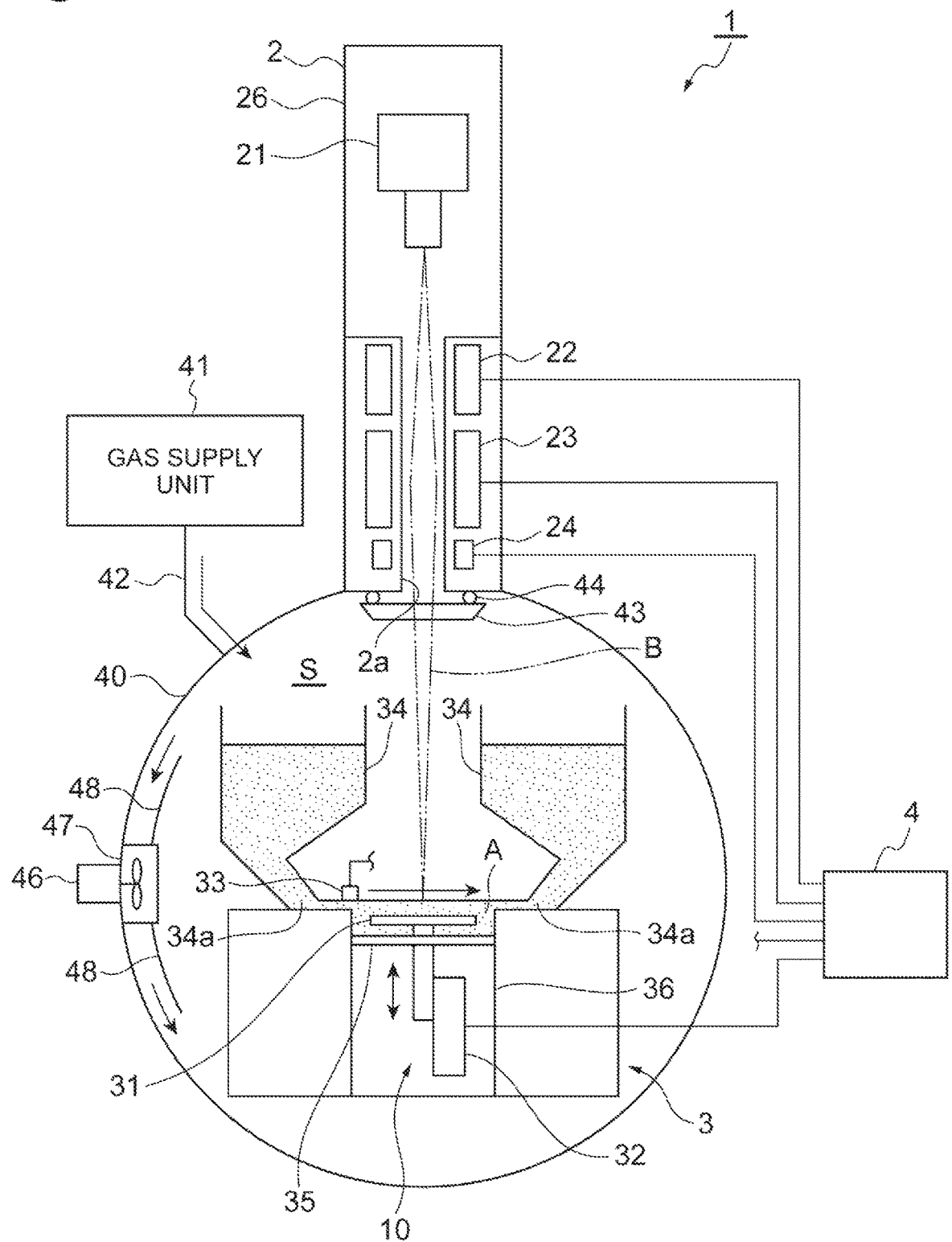
FIG. 1 is a diagram illustrating a schematic configuration of an additive manufacturing device according to an embodiment of the present disclosure.

An additive manufacturing device according to one aspect of the present disclosure includes a molding unit including a molding tank accommodating a manufactured object and forming the manufactured object in the molding tank, a pressure vessel accommodating the molding unit, and a gas supply unit connected to the pressure vessel, supplying a gas into the pressure vessel, and configured to pressurize an inner portion of the pressure vessel.

According to this additive manufacturing device, the molding unit is accommodated in the pressure vessel and the gas is supplied into the pressure vessel by the gas supply unit. For example, the inner portion of the pressure vessel is pressurized after the additive manufacturing of the powder in a vacuum. With the pressure increased, the gas is capable of surrounding the molding tank and flowing into the molding tank, and thus the manufactured object can be rapidly cooled by the gas. As a result, the cooling of the manufactured object can be more effectively promoted than in the case of the related art where radiational cooling is performed with a manufactured object held in a vacuum or the atmosphere or a molding box is cooled by a refrigerant being allowed to flow through a flow path of a molding box.

In some embodiments, a hole portion allowing an inside and an outside of a wall portion of the molding tank to communicate with each other is provided in the wall portion. In this case, the gas increased in pressure easily flows into the molding tank through the hole portion provided in the wall portion of the molding tank. As a result, the cooling of the manufactured object by the gas is further effectively promoted.

In some embodiments, the molding tank is configured such that the hole portion remains closed during the molding of the manufactured object and the hole portion opens after the molding of the manufactured object. According to the molding tank configured as described above, the atmosphere in the molding tank (including a vacuum state) is maintained during the molding of the manufactured object and a gas flows into the molding tank after the molding of the manufactured object. As a result, molding and cooling are appropriately performed.

Another aspect of the present disclosure is a manufacturing method for an additive-manufactured object using a molding unit molding an additive-manufactured object in a molding tank and a pressure vessel accommodating the molding unit. The manufacturing method includes a molding step of molding the additive-manufactured object in the molding tank and a gas supplying step of pressurizing an inner portion of the pressure vessel by supplying a gas into the pressure vessel after the molding step is completed.

According to this manufacturing method for an additive-manufactured object, the gas supplying step is performed after the molding step is completed, the gas is supplied into the pressure vessel, and the inner portion of the pressure vessel is pressurized. With the pressure increased, the gas is capable of surrounding the molding tank and flowing into the molding tank, and thus the additive-manufactured object can be rapidly cooled by the gas. As a result, the cooling of the additive-manufactured object can be more effectively promoted than in the case of the related art where radiational cooling is performed with a manufactured object held in a vacuum or the atmosphere or a molding box is cooled by a refrigerant being allowed to flow through a flow path of a molding box.

In some embodiments, a hole portion allowing an inside and an outside of a wall portion of the molding tank to communicate with each other is provided in the wall portion, the hole portion is closed in the molding step, and the hole portion is opened and the gas is introduced into the hole portion in the gas supplying step. When the hole portion is opened/closed at such a timing, the atmosphere in the molding tank (including a vacuum state) is maintained during the molding of the manufactured object and a gas flows into the molding tank after the molding of the manufactured object. As a result, molding and cooling are appropriately performed.

Hereinafter, an embodiment of the present disclosure will be described with reference to the drawings. It should be noted that the same elements will be denoted by the same reference symbols without redundant description in the description of the drawings.

A basic configuration of an additive manufacturing device 1 according to the present embodiment will be described with reference to FIG. 1. As illustrated in FIG. 1, the additive manufacturing device 1 is a device that molds a three-dimensional object by melting and solidifying powder A by irradiating the powder A with an electron beam B. The additive manufacturing device 1 includes an electron beam emission unit 2, a molding unit 3, and a control unit 4.

The electron beam emission unit 2 melts the powder A by emitting the electron beam B to the powder A of the molding unit 3. The electron beam emission unit 2 may preheat the powder A by irradiating the powder A with the electron beam B before the molding of the object is performed.

The electron beam emission unit 2 includes an electron gun unit 21, an aberration coil 22, a focus coil 23, and a deflection coil 24. The electron gun unit 21 is electrically connected to the control unit 4, operates in response to a control signal from the control unit 4, and emits the electron beam B. The electron gun unit 21 is provided so as to, for example, emit the electron beam B downward. The aberration coil 22 is electrically connected to the control unit 4 and operates in response to a control signal from the control unit 4. The aberration coil 22 is installed around the electron beam B emitted from the electron gun unit 21 and corrects the aberration of the electron beam B. The focus coil 23 is electrically connected to the control unit 4 and operates in response to a control signal from the control unit 4. The focus coil 23 is installed around the electron beam B emitted from the electron gun unit 21, converges the electron beam B, and adjusts the focus state at the irradiation position of the electron beam B. The deflection coil 24 is electrically connected to the control unit 4 and operates in response to a control signal from the control unit 4. The deflection coil 24 is installed around the electron beam B emitted from the electron gun unit 21 and adjusts the irradiation position of the electron beam B in accordance with a control signal. It should be noted that the aberration coil 22 may be omitted.

The electron gun unit 21, the aberration coil 22, the focus coil 23, and the deflection coil 24 are installed in, for example, a tubular column 26. The electron beam emission unit 2 emits the electron beam B from an emission port 2a provided at the lower end of the column 26 toward a molding surface formed in the molding unit 3.

The molding unit 3 is a part where a manufactured object C (additive-manufactured object, see FIG. 2), which is a desired object, is molded. The molding unit 3 includes a molding tank 36, a plate 31, a lifting and lowering device 10, two hoppers 34, and an application mechanism 33. The molding unit 3 is provided below the electron beam emission unit 2. The molding unit 3 molds the manufactured object C in the molding tank 36. The equipment constituting the molding unit 3 may be unitized.

The plate 31 is a flat plate-shaped member disposed in the molding tank 36. The plate 31 supports the object to be molded. The plate 31 has a circular shape or the like. The shape of the plate 31 corresponds to the shape of a molding region. The plate 31 has a diameter smaller than the inner diameter of the molding tank 36 and a gap is formed between the plate 31 and a side wall 36a of the side wall 36a. The plate 31 is disposed on an extension line in the emission direction of the electron beam B and is provided toward, for example, a horizontal direction. The plate 31 and the molding tank 36 are installed concentrically.

The lifting and lowering device 10 supports the plate 31 and lifts and lowers the plate 31 in an up-down direction in the molding tank 36. The lifting and lowering device 10 has a lifting and lowering stage 35 installed below the plate 31 and supporting the plate 31 and a lifting and lowering machine 32 lifting and lowering the plate 31 and the lifting and lowering stage 35. The lifting and lowering machine 32 is electrically connected to the control unit 4 and operates in response to a control signal from the control unit 4. The lifting and lowering machine 32 moves the plate 31 and the lifting and lowering stage 35 upward in the early stage of the object molding and lowers the plate 31 each time the powder A is melted, solidified, and layered on the plate 31. The manufactured object C is molded on the plate 31. The molding surface is formed on the upper surface of the manufactured object C. Specific configurations of the lifting and lowering device 10 and the lifting and lowering machine 32 are not limited to the above-described configurations and may be other known configurations. The shapes of the plate 31, the lifting and lowering stage 35, and the molding tank 36 can be appropriately changed in accordance with the shape of the manufactured object C or the like.

Figure 2:
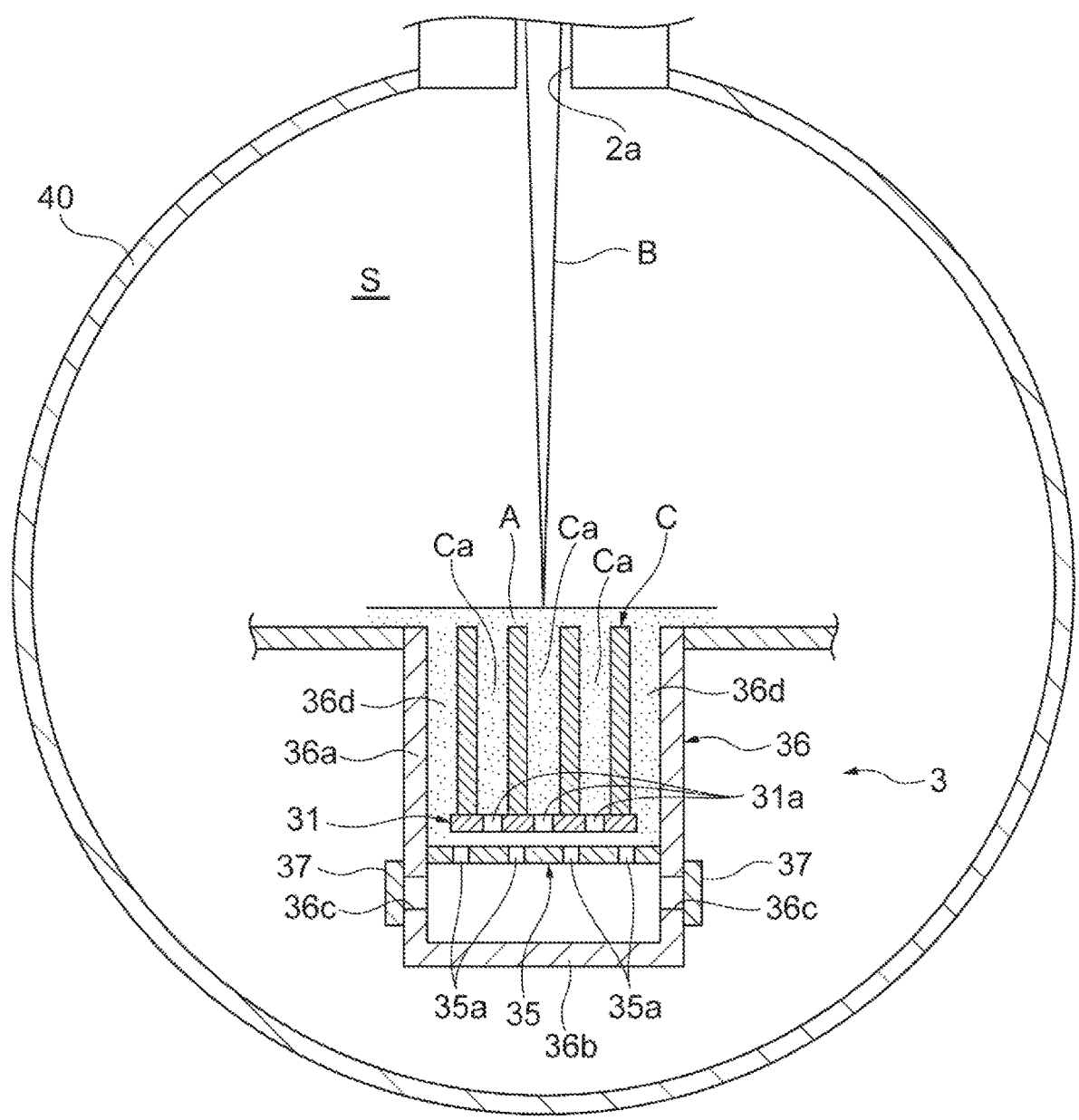
FIG. 2 is a diagram illustrating a molding tank in a pressure vessel and a manufactured object molded in the molding tank.

The molding tank 36 accommodates the manufactured object C to be molded on the plate 31 and the powder A that has not been melted. The molding tank 36 is formed in, for example, a cylindrical shape and extends toward the movement direction of the plate 31. This molding tank 36 is formed in a circular cross section concentric with the plate 31. As illustrated in FIG. 2, the molding tank 36 includes the cylindrical side wall (wall portion) 36a and a bottom wall 36b closing the lower end of the side wall 36a. The lifting and lowering stage 35 is formed in accordance with the shape of the inner surface of the molding tank 36, that is, the side wall 36a. In a case where the inner surface of the molding tank 36 is circular in a horizontal cross section, the outer shape of the lifting and lowering stage 35 is also circular. As a result, downward leakage of the powder A supplied to the molding tank 36 from the lifting and lowering stage 35 is suppressed. It should be noted that a seal material may be provided in the outer edge portion of the lifting and lowering stage 35 so that downward leakage of the powder A from the lifting and lowering stage 35 is suppressed. The shape of the molding tank 36 is not limited to a cylindrical shape and the shape of the molding tank 36 may be a square tube shape having a rectangular cross section.

The application mechanism 33 is a member that supplies the powder A onto the plate 31 and levels the surface of the powder A and the application mechanism 33 functions as a recoater. For example, a rod-shaped or plate-shaped member is used as the application mechanism 33 and the application mechanism 33 supplies the powder A to the irradiation region of the electron beam B by moving in the horizontal direction and levels the surface of the powder A. The movement of the application mechanism 33 is controlled by an actuator (not illustrated) and a mechanism (not illustrated). The application mechanism 33 operates in response to a control signal from the control unit 4. It should be noted that a known mechanism other than the application mechanism 33 may be used as a mechanism leveling the powder A.

The hopper 34 is a container accommodating the powder A. A discharge port 34a for discharging the powder A is formed in the lower portion of the hopper 34. The powder A discharged from the discharge port 34a flows in onto the plate 31 or is supplied onto the plate 31 by the application mechanism 33. It should be noted that a mechanism other than the application mechanism 33 and the hopper 34 can be used as a mechanism supplying the powder A in layers onto the plate 31.

Multiple powder bodies constitute the powder A. Metallic powder or the like is used as the powder A. In addition, granules larger in particle size than the powder may be used as the powder A insofar as the granules can be melted and solidified by being irradiated with the electron beam B.

The control unit 4 is an electronic control unit controlling the entire additive manufacturing device 1. The control unit 4 is configured to include a computer and hardware such as a central processing unit (CPU), a read only memory (ROM), and a random access memory (RAM) and software such as a program stored in the ROM constitute the computer. The control unit 4 executes lifting and lowering control on the plate 31, operation control on the application mechanism 33, emission control on the electron beam B, operation control on the deflection coil 24, and so on. The control unit 4 outputs a control signal to the lifting and lowering machine 32, operates the lifting and lowering machine 32, and adjusts the up-down position of the plate 31 as the lifting and lowering control on the plate 31. The control unit 4 operates the application mechanism 33 before the emission of the electron beam B and causes the powder A to be supplied onto the plate 31 and leveled as the operation control on the application mechanism 33. The control unit 4 outputs a control signal to the electron gun unit 21 and causes the electron gun unit 21 to emit the electron beam B as the emission control on the electron beam B.

The control unit 4 outputs a control signal to the deflection coil 24 and controls the irradiation position of the electron beam B as the operation control on the deflection coil 24. For example, three-dimensional computer-aided design (CAD) data on the manufactured object C, which is an object to be molded, is input to the control unit 4. The control unit 4 generates two-dimensional slice data on the basis of this three-dimensional CAD data. The slice data is, for example, data on a horizontal cross section of the manufactured object C and an aggregate of multiple data corresponding to an up-down position. The region where the powder A on the molding surface is irradiated with the electron beam B is determined on the basis of this slice data and a control signal is output to the deflection coil 24 in accordance with that region.

In the additive manufacturing device 1 of the present embodiment, the molding unit 3 is provided in, for example, a cylindrical pressure vessel 40. In other words, the additive manufacturing device 1 accommodates the molding unit 3 including the molding tank 36, the plate 31, the lifting and lowering device 10, the hopper 34, and the application mechanism 33. In the molding step of molding the manufactured object C in the additive manufacturing device 1, the inside of the pressure vessel 40 is put into a vacuum or a substantially vacuum state. On the other hand, after the molding of the manufactured object C is completed, that is, after the molding step is completed, an inert gas is supplied into the pressure vessel 40 and an internal space S of the pressure vessel 40 is pressurized. A manufacturing method for the manufactured object C using the additive manufacturing device 1 includes such a process, and thus the cooling of the manufactured object C is effectively promoted.

Hereinafter, a configuration related to the cooling of the manufactured object C will be described in detail. The pressure vessel 40 is made of, for example, a steel plate. The pressure vessel 40 includes, for example, a cylinder portion and end plates joined to both axial ends of the cylinder portion. A clutch ring or the like may be provided in the portion where the cylinder portion and the end plate are joined to each other. The pressure vessel 40 is installed in a state where the central axis of the cylinder portion is directed in the horizontal direction. In other words, the direction of the central axis of the pressure vessel 40 is substantially orthogonal to the direction of each of the central axes of the column 26 and the molding tank 36.

The pressure vessel 40 is connected to the lower end of the column 26 of the electron beam emission unit 2. The inner portions of the electron beam emission unit 2 and the pressure vessel 40 are airtight with respect to the outside. The lower end of the column 26 may be fitted into a through hole formed in the cylinder portion of the pressure vessel 40 and then joined to the cylinder portion by welding or the like. Alternatively, the lower end of the column 26 may be joined by means of a fastening member or the like to a nozzle (piping, a flange, or the like) attached to the cylinder portion of the pressure vessel 40. The form of connection of the pressure vessel 40 to the column 26 is not limited to the above and may be another form in which airtightness can be maintained. The pressure vessel 40 may be installed in, for example, a state where the central axis of the cylinder portion is directed vertically (vertical installation) instead of horizontally (horizontal installation). In other words, the direction of the central axis of the pressure vessel 40 and the direction of each of the central axes of the column 26 and the molding tank 36 may be in the same direction.

The pressure vessel 40 has a structure capable of withstanding a pressure of, for example, approximately 1 MPa. The pressure vessel 40 may be configured to, for example, comply with the Class 2 pressure vessel standards. The shape of the pressure vessel 40 is not limited to a cylindrical shape and the shape may be a square tube shape having a rectangular cross section.

The molding tank 36, the lifting and lowering device 10, the hopper 34, and the application mechanism 33 of the molding unit 3 are fixed to the inner surface side of the pressure vessel 40 directly or via a support member or the like. In a case where the equipment of the molding unit 3 is unitized, the unit may be fixed to the inner surface side of the pressure vessel 40. A plurality of leg portions for installing the pressure vessel 40 and the electron beam emission unit 2 in a self-standing state are attached in the lower portion of the outer peripheral surface of the pressure vessel 40.

The additive manufacturing device 1 further includes a gas supply unit 41 connected to the pressure vessel 40 and supplying an inert gas into the pressure vessel 40. The inert gas used in the additive manufacturing device 1 is, for example, nitrogen. The gas supply unit 41 is disposed outside the pressure vessel 40. The gas supply unit 41 is connected to the pressure vessel 40 by, for example, a gas line 42. The gas line 42, which is piping, communicates with the internal space S of the pressure vessel 40 and introduces the inert gas that is sent from the gas supply unit 41 into the internal space S of the pressure vessel 40. The gas line 42 may be provided with valves or the like that enable or disable gas supply to the pressure vessel 40.

The gas supply unit 41 includes, for example, an inert gas storage tank (not illustrated) and air supply means (not illustrated) such as a pump and a blower for sending the inert gas that is stored in the storage tank to the pressure vessel 40. In other words, in the present embodiment, the inert gas has a gas source disposed outside the pressure vessel 40. The air supply means of the gas supply unit 41 operates in response to, for example, a control signal from the control unit 4. The pressure vessel 40 may be provided with a pressure gauge (not illustrated) detecting the pressure of the internal space S. The control unit 4 may control the air supply means of the gas supply unit 41 on the basis of a signal indicating the pressure of the internal space S output from the pressure gauge.

The gas supply unit 41 supplies an inert gas into the pressure vessel 40 under the control of the control unit 4 such that the pressure of the internal space S of the pressure vessel 40 becomes, for example, a value in the range of 0.1 to 1 MPa. In this manner, the gas supply unit 41 is configured to pressurize the inner portion of the pressure vessel 40 to the atmospheric pressure or a higher-than-atmospheric pressure. The degree of pressurization by the gas supply unit 41 can be appropriately set in accordance with the size of the molding tank 36, the size of the manufactured object C, the material of the powder A, the required cooling time, or the like. It should be noted that the gas in the pressure vessel 40 is not discharged to the outside when the inner portion of the pressure vessel 40 is pressurized by the inert gas being supplied.

A fan 46 and a radiator (heat exchanger) 47 may be attached to the cylinder portion of the pressure vessel 40. The fan 46 and the radiator 47 can be controlled by the control unit 4. An electric current is supplied from an external electric power source, the blade portions of the fan 46 rotate, and the inert gas of the internal space S of the pressure vessel 40 is passed with respect to the radiator 47 through which cooling water or the like flows. As a result, the inert gas in the pressure vessel 40 is cooled and the cooling of the manufactured object C is further promoted. A duct 48 for promoting inert gas convection may be provided on the inner surface side of the pressure vessel 40. The cooling of the manufactured object C can be accelerated by means of the fan 46, the radiator 47, and the duct 48. The fan 46 and the radiator 47 may be installed outside the pressure vessel 40. The fan 46 and the radiator 47 may be connected to the internal space S of the pressure vessel 40 via a pipe (flow path, not illustrated).

The configuration of the molding tank 36 and its surroundings will be described in detail with reference to FIG. 2. The side wall 36*a* of the cylindrical molding tank 36 is provided with a plurality of hole portions, i.e. apertures, 36*c* allowing the inside and the outside of the side wall 36*a* to communicate with each other. The plurality of hole portions 36*c* may be formed in the lower portion the side wall 36*a*. The plurality of hole portions 36*c* may be formed at equal intervals in a circumferential direction. It should be noted that only one hole portion, a single aperture, 36*c* may be formed.

A plurality of opening/closing portions, i.e. valve mechanisms, 37 respectively covering and closing the hole portions 36*c* are attached to the side wall 36*a* of the molding tank 36. The opening/closing portions 37 are controlled by, for example, the control unit 4 and are capable of opening and closing the respective hole portions 36*c*. The structure of the opening/closing mechanism of the hole portion 36*c* is not particularly limited. For example, each hole portion 36*c* may be opened/closed by the plurality of opening/closing portions 37 being attached to a drive ring disposed on the outer peripheral side of the molding tank 36 and the drive ring being moved along the circumferential direction by an actuator.

The lifting and lowering stage 35 is provided with a plurality of ventilation holes 35*a* penetrating the lifting and lowering stage 35 in the plate thickness direction (up-down direction). The plurality of ventilation holes 35*a* may be uniformly formed in the entire region that is positioned below the plate 31. It should be noted that only one ventilation hole 35*a* may be formed.

Further, the plate 31 is provided with one or more ventilation holes 31*a* penetrating the plate 31 in the plate thickness direction (up-down direction). The ventilation hole 31*a* may be formed so as to correspond to the shape of the bottom portion of the manufactured object C. In other words, the ventilation hole 31*a* may be formed at a position corresponding to a gap Ca of the manufactured object C. It should be noted that the manufactured object C that has a plurality of columnar structures is illustrated and the gap Ca is formed between the columns in the example of FIG. 2. Further, the ventilation hole 31*a* is formed at the position of the lower end of the gap Ca.

These hole portion 36*c*, ventilation hole 35*a*, and ventilation hole 31*a* promote the cooling of the inner portion of the molding tank 36 by allowing the inert gas supplied from the gas supply unit 41 to be introduced into the molding tank 36 after the molding of the manufactured object C is completed. It should be noted that the ventilation hole 35*a* and the ventilation hole 31*a* may be omitted. In addition, one or more hole portions may be provided in the bottom wall 36*b* of the molding tank 36. In that case, an opening/closing mechanism opening/closing the hole portion provided in the bottom wall 36*b* may be provided.

As described above, the space in the column 26 and the internal space S of the pressure vessel 40 are connected to each other. The internal space of the pressure vessel 40 communicates with the internal space of the column 26. During the molding step, the electron beam B passes through these communicating spaces (see FIG. 2). As illustrated in FIG. 1, a sealing valve 43 is attached via an O-ring 44 to the lower end of the electron beam emission unit 2, that is, the lower end of the column 26. The sealing valve 43 is controlled by, for example, the control unit 4 and is capable of opening/closing the emission port 2*a*. In a state where the sealing valve 43 is closed, the sealing valve 43 shields the space in the column 26 from the internal space S of the pressure vessel 40. Specifically, the sealing valve 43 seals the emission port 2a after the completion of the molding step and before the gas supply unit 41 supplies the inert gas to the pressure vessel 40. As a result, inert gas intrusion into the electron beam emission unit 2 is prevented and the electron beam emission unit 2 is protected. It should be noted that the sealing valve 43 and the O-ring 44 are not illustrated in FIG. 2.

Subsequently, a manufacturing method for the manufactured object C of the present embodiment will be described with reference to FIGS. 2 and 3. First, a molding step of molding the manufactured object C is performed. As illustrated in FIG. 2, in the molding step, the inside of the pressure vessel 40 is put into a vacuum or a substantially vacuum state and the emission port 2a is opened. The hole portion 36c of the molding tank 36 remains closed by the opening/closing portion 37. Meanwhile, the powder A is discharged through the discharge port 34a of the hopper 34 and the powder A is supplied onto the plate 31 by the application mechanism 33. The electron beam emission unit 2 is controlled by the control unit 4 and the powder A on the molding surface is irradiated with the electron beam B. For example, in the molding step, one or more preheating processes and a main melting process are performed for each layer. A predetermined region is irradiated with the electron beam B in each of the plurality of layers and the powder A is melt and solidified into a desired shape. The manufactured object C is molded as a result of the molding step. The gap Ca of the manufactured object C and a gap 36d between the manufactured object C and the bottom wall 36b remain filled with the powder A.

Figure 3:
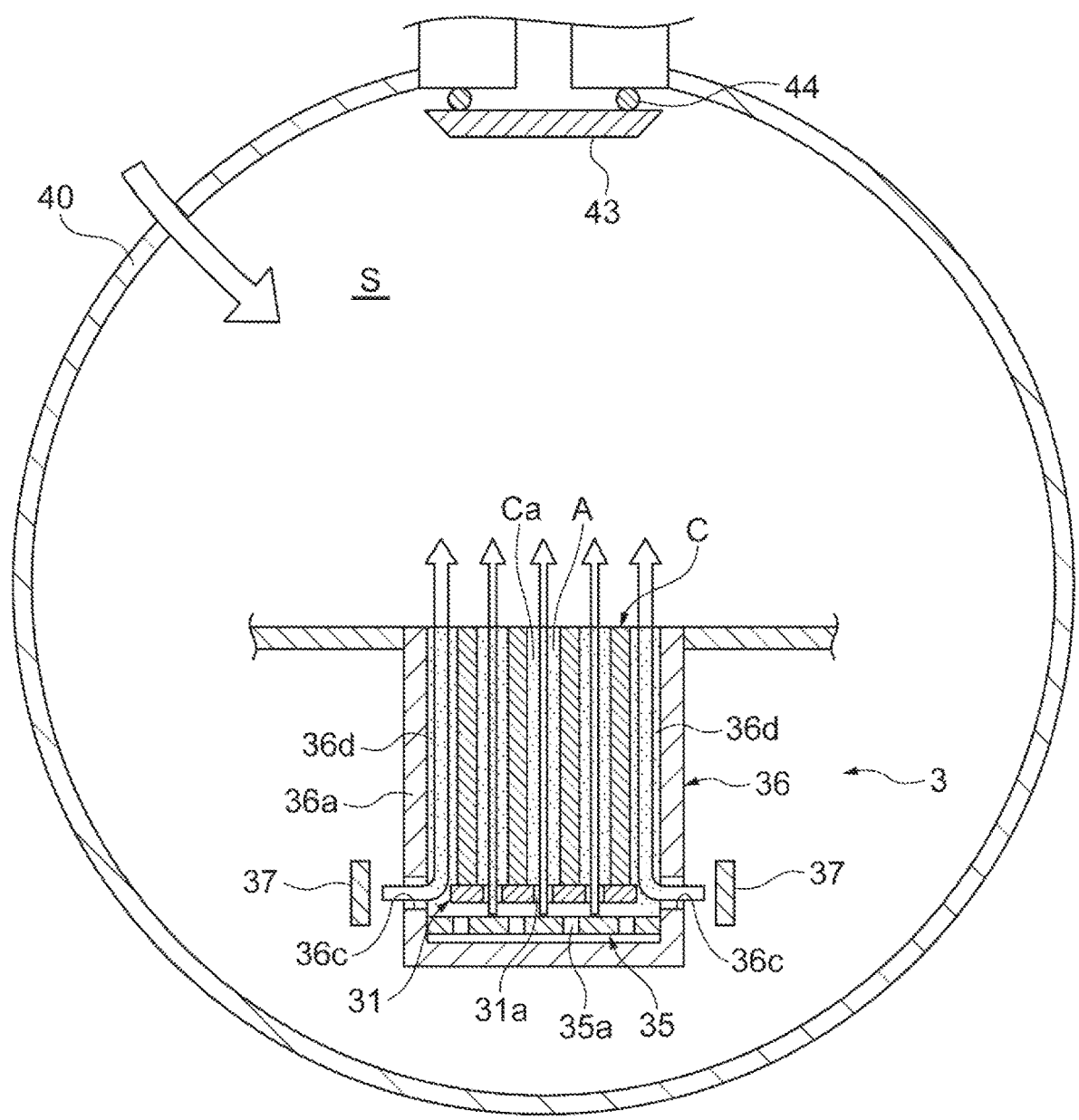
FIG. 3 is a diagram for describing a gas supplying step in the additive manufacturing device.

Next, the emission of the electron beam B is stopped and the sealing valve 43 is closed as illustrated in FIG. 3. A gas supplying step of supplying a gas into the pressure vessel 40 is performed after the completion of the molding step. In the gas supplying step, an inert gas is supplied from the gas supply unit 41 to the internal space S of the pressure vessel 40 and the inner portion of the pressure vessel 40 is pressurized until the inside of the pressure vessel 40 reaches a predetermined value in the range of, for example, 0.1 to 1 MPa. At the point in time when the molding step is completed, the lifting and lowering stage 35 is positioned below the hole portion 36c. The opening/closing portion 37 is driven in the opening direction and the hole portion 36c opens to the outside. As a result, the inert gas is introduced into the hole portion 36c, passes through the gap Ca through the ventilation hole 31a, and passes through the gap 36d through the space between the plate 31 and the side wall 36a (see the arrow in the drawing). The inert gas cools the powder A present in the gap Ca and the gap 36d and cools the manufactured object C. In addition, the inert gas surrounds the molding tank 36 and cools the molding tank 36 from the outer peripheral side. On the other hand, when the inert gas is supplied to the pressure vessel 40, the fan 46 and the radiator 47 are operated and the convection of the inert gas is promoted. The manufactured object C is taken out when the temperature of the manufactured object C reaches a predetermined value or less and the cooling is completed. It should be noted that FIG. 3 schematically illustrates how the opening/closing portion 37 opens.

It should be noted that the plate 31 may be positioned above the hole portion 36c at the point in time when the molding step is completed. In this case, the gas introduced into the molding tank 36 through the hole portion 36c is supplied onto the plate 31 through the ventilation hole 31a from below the plate 31.

In addition, the lifting and lowering stage 35 may be positioned above the hole portion 36c although the lifting and lowering stage 35 is positioned below the hole portion 36c at the point in time when the molding step is completed in the above-described form. In other words, the ventilation hole 35a and the ventilation hole 31a may be positioned above the hole portion 36c at the point in time when the molding step is completed. In this case, the gas introduced into the molding tank 36 through the hole portion 36c is capable of flowing in onto the plate 31 through the ventilation hole 35a and the ventilation hole 31a from below the lifting and lowering stage 35.

In a case where a hole portion is provided in the bottom wall 36b of the molding tank 36, the gas introduced into the molding tank 36 through the hole portion of the bottom wall 36b is capable of flowing in onto the plate 31 through the ventilation hole 35a and the ventilation hole 31a from below the lifting and lowering stage 35.

According to the additive manufacturing device 1 and the manufacturing method for the manufactured object C of the present embodiment, the gas supplying step is performed after the molding step is completed, the inert gas is supplied into the pressure vessel 40, and the inner portion of the pressure vessel 40 is pressurized. For example, the inner portion of the pressure vessel 40 is pressurized after the additive manufacturing of the powder in a vacuum. With the pressure increased, the inert gas is capable of surrounding the molding tank 36 of the molding unit 3 and flowing into the molding tank 36, and thus the manufactured object C can be rapidly cooled by the inert gas. As a result, the cooling of the manufactured object C can be more effectively promoted than in the case of the related art where radiational cooling is performed with a manufactured object held in a vacuum or the atmosphere or a molding box is cooled by a refrigerant being allowed to flow through a flow path of a molding box. According to the present embodiment, the manufactured object C is rapidly cooled. The cooling time of the manufactured object C according to the present embodiment is significantly shorter than (is, for example, approximately 10% of) the cooling time in a vacuum or the atmosphere of the related art.

The inert gas increased in pressure easily flows into the molding tank 36 through the hole portion 36c provided in the side wall 36a of the molding tank 36. As a result, the cooling of the manufactured object C by the inert gas is further effectively promoted.

The hole portion 36c remains closed during the molding of the manufactured object C and is opened after the manufactured object C is molded. In other words, the hole portion 36c is closed in the molding step and the hole portion 36c is opened and an inert gas is introduced into the hole portion 36c in the gas supplying step. When the hole portion 36c is opened/closed at such a timing in the molding tank 36, the atmosphere in the molding tank 36 (including a vacuum state) is maintained during the molding of the manufactured object C and an inert gas flows into the molding tank 36 after the molding of the manufactured object C. As a result, molding and cooling are appropriately performed.

The present invention is not limited to the embodiment of the present disclosure that has been described above. For example, the type of the gas that is used for the cooling may be an inert gas other than nitrogen. For example, the powder material is not limited to metal and the powder material may be resin, ceramic, or the like. In addition, argon, helium, or the like may be used as a cooling gas. In addition, another type of gas may be used insofar as the gas does not adversely affect the manufactured object C. For example, another type of gas may be used insofar as the gas does not cause a reaction even in touching the manufactured object C. For example, an oxygen-containing gas (such as air) may be used with respect to the manufactured object C made of ceramic.

A hole portion may be provided at a part other than the lower portion of the side wall 36a of the molding tank 36. The hole portion may be configured to be opened during molding. The hole portion may be provided in the upper portion of the side wall 36a and the opening/closing portion 37 covering the hole portion 36c may be omitted. No hole portion may be provided with respect to the molding tank 36.

In addition, in the manufacturing method for an additive-manufactured object, cooling can also be performed by means of a device different from the additive manufacturing device 1. In other words, the pressure vessel 40 may be removed from the additive manufacturing device 1 and the cooling of the molding unit 3 and the manufactured object C by gas supply and pressurization may be performed in another place without the cooling and the preceding processes being performed in the additive manufacturing device 1. In this case, the pressure vessel 40 may be configured to be removable from the additive manufacturing device 1 in a state where the molding unit 3 is incorporated. The gas supply unit 41 and the gas line 42 may be omitted in the additive manufacturing device 1. In addition, the vessel accommodating the molding unit 3 may be another vessel that is capable of withstanding vacuumization and is not a pressure vessel, the molding unit 3 may be moved under a certain vacuum environment after being taken out of the vessel after molding, and the manufactured object C may be cooled in a pressure vessel provided in a place different from a molding area. The manufactured object C after the molding may be moved in the atmosphere in a case where the manufactured object C is made of a material (non-metal material) that does not react with oxygen or the like even when exposed to the atmosphere. In that case, a gas supply unit is connected to the pressure vessel.

The pressure in the case of pressurization of the inner portion of the pressure vessel can be appropriately changed. The pressure vessel may not be configured to comply with standards. Pressure setting based on no established standards may be performed with respect to the pressure vessel.

The additive manufacturing device is not limited to a molding device to which an electron beam melting method is applied and the additive manufacturing device may be, for example, a molding device to which a laser melting method is applied. In other words, the beam that is emitted to the powder A in the additive manufacturing device may be a laser beam. The beam that is emitted to the powder A in the additive manufacturing device may be a charged particle beam, which is a concept including an electron beam and an ion beam. The beam that is emitted to the powder A in the additive manufacturing device may be an energy beam capable of supplying energy to the powder A.

INDUSTRIAL APPLICABILITY

According to several aspects of the present disclosure, cooling of a manufactured object can be effectively promoted.

REFERENCE SIGNS LIST

1: additive manufacturing device, 2: electron beam emission unit, 3: molding unit, 4: control unit, 31: plate, 33: application mechanism, 34: hopper, 35: lifting and lowering stage, 36: molding tank, 36a: side wall (wall portion), 36c: hole portion, 37: opening/closing portion, 40: pressure vessel, 41: gas supply unit, 42: gas line, A: powder, C: manufactured object (additive-manufactured object), Ca: gap, S: internal space.

The invention claimed is:

1. An additive manufacturing device comprising:
   a molding tank having at least one aperture at a side wall and configured to form a manufactured object therein;
   a pressure vessel having an inner portion accommodating the molding tank therein;
   a valve mechanism attached to the side wall and configured to open and close the at least one aperture;
   a gas supply connected to the pressure vessel configured to supply an inert gas into the pressure vessel to pressurize the inner portion of the pressure vessel that contains the molding tank; and
   a controller including a processor configured to control the valve mechanism and the gas supply, such that:
      the controller controls the valve mechanism to close the at least one aperture during formation of the manufactured object in the molding tank and to open the at least one aperture after formation of the manufactured object in the molding tank, and
      the controller controls the gas supply to supply the inert gas into the pressure vessel to pressurize the inner portion of the pressure vessel after formation of the manufactured object in the molding tank.

2. The additive manufacturing device according to claim 1 wherein the at least one aperture is a plurality of apertures.

3. A manufacturing method for an additive-manufactured object, the manufacturing method comprising:
   providing an additive manufacturing device according to claim 1;
   forming an additive-manufactured object in the molding tank; and
   pressurizing the inner portion of the pressure vessel that contains the molding tank by supplying an inert gas into the pressure vessel after the forming is completed.

* * * * *